United States Patent [19]

Maucher et al.

[11] Patent Number: 5,180,335

[45] Date of Patent: * Jan. 19, 1993

[54] TORSION DAMPING ASSEMBLY FOR USE WITH CLUTCHES IN MOTOR VEHICLES

[75] Inventors: Paul Maucher, Sasbach; Oswald Friedmann, Lichtenau, both of Fed. Rep. of Germany

[73] Assignee: Luk Lamellen Und Kupplungsbau GmbH, Bühl, Fed. Rep. of Germany

[*] Notice: The portion of the term of this patent subsequent to Jun. 9, 2009 has been disclaimed.

[21] Appl. No.: 256,236

[22] Filed: Oct. 11, 1988

Related U.S. Application Data

[63] Continuation of Ser. No. 717,327, Mar. 29, 1985, abandoned.

[30] Foreign Application Priority Data

Jun. 12, 1984 [DE] Fed. Rep. of Germany ....... 3421698
Jul. 7, 1984 [DE] Fed. Rep. of Germany ....... 3425159

[51] Int. Cl.⁵ .......................... F16D 3/14; F16F 15/10
[52] U.S. Cl. ........................................ 464/68; 74/574; 192/70.18; 192/106.2; 464/66
[58] Field of Search ............ 74/574; 192/70.17, 70.18, 192/106.1, 106.2, 110 B; 464/62, 63, 64, 66, 67, 68

[56] References Cited

U.S. PATENT DOCUMENTS

| 3,091,949 | 6/1963 | Sink | 464/68 |
|---|---|---|---|
| 3,101,600 | 8/1963 | Stromberg | 192/106.2 X |
| 4,220,233 | 9/1980 | Ban et al. | 192/106.2 |
| 4,222,476 | 9/1980 | LeBrise | 192/106.2 |
| 4,274,524 | 6/1981 | Nakane | 192/70.17 X |
| 4,318,283 | 3/1982 | Windish | 192/106.2 X |
| 4,381,052 | 4/1983 | Maucher | 192/106.2 |
| 4,410,075 | 10/1983 | Caray et al. | 464/68 X |
| 4,570,775 | 2/1986 | Caray et al. | 464/68 X |
| 4,579,212 | 4/1986 | Kittel | 192/106.2 |
| 4,611,701 | 9/1986 | Friedmann | 192/110 B |
| 4,727,970 | 3/1988 | Reik et al. | 464/68 X |

FOREIGN PATENT DOCUMENTS

| 163360 | 12/1980 | Japan | 464/83 |
|---|---|---|---|
| 2098702 | 11/1982 | United Kingdom | 464/68 |

*Primary Examiner*—Daniel P. Stodola
*Attorney, Agent, or Firm*—Peter K. Kontler

[57] ABSTRACT

A torsion damping assembly which is installed between the crankshaft of the engine and the input shaft of the change-speed transmission in a motor vehicle has two coaxial flywheels which are rotatable within the limits relative to each other against the opposition of two series-connected dampers. One of the dampers has an input element in the form of two coaxial discs which are affixed to one of the flywheels and bear against the radially outwardly extending arms of a flange-like torque transmitting output element constituting the input element of the other damper. The output element of the other damper is constituted by two discs which are disposed radially inwardly of the discs of the one damper, which directly or indirectly bear against the adjacent portion of the flange-like output element of the one damper, and which rotate with the other flywheel.

82 Claims, 5 Drawing Sheets

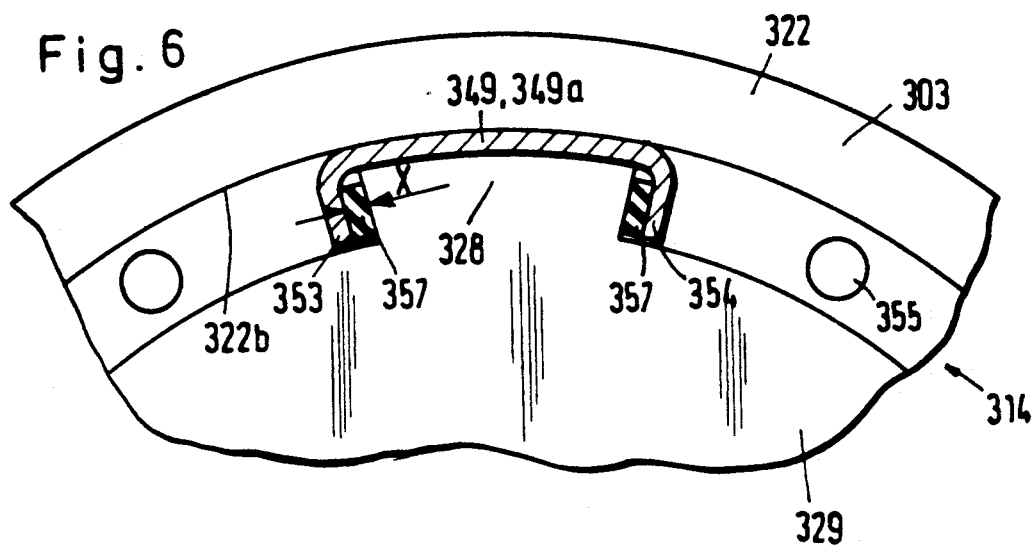
Fig. 6
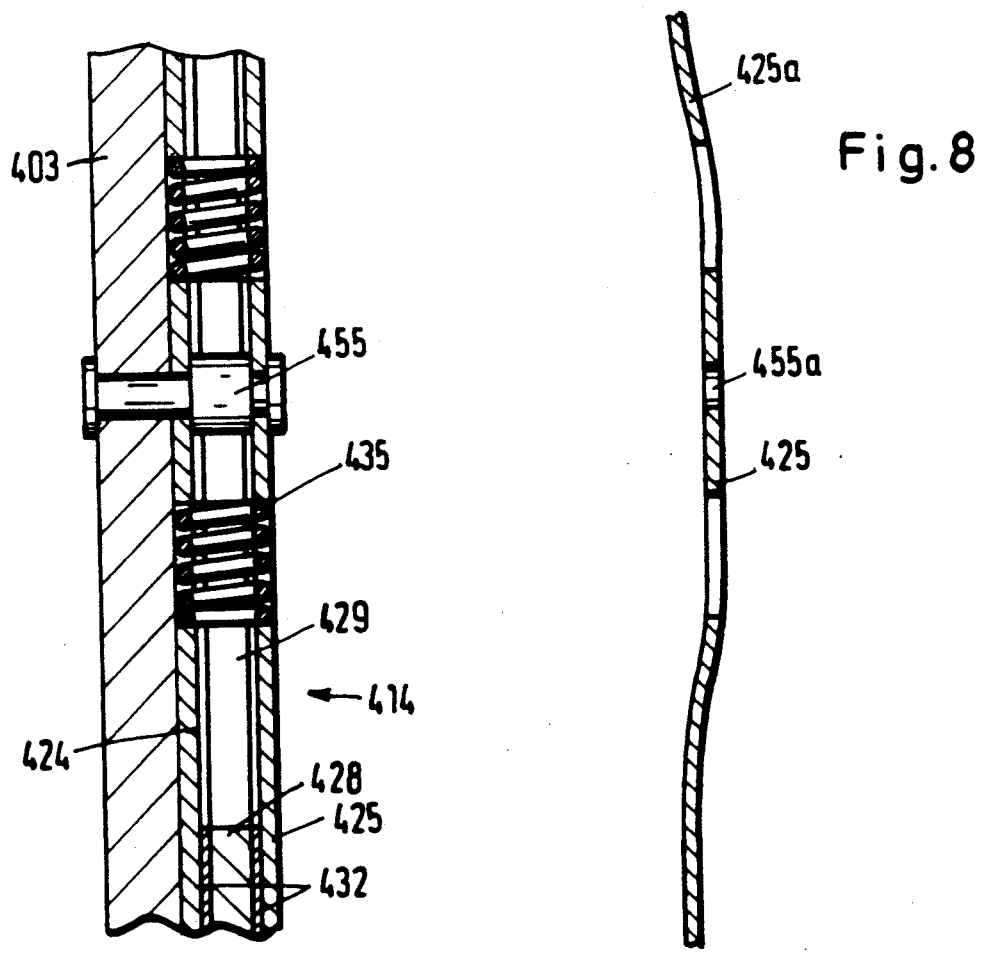
Fig. 7
Fig. 8

TORSION DAMPING ASSEMBLY FOR USE WITH CLUTCHES IN MOTOR VEHICLES

CROSS-REFERENCE TO RELATED CASE

This application is a continuation of the copending patent application Ser. No. 06/717,327 filed Mar. 29, 1985, now abandoned.

BACKGROUND OF THE INVENTION

The present invention relates to torsion damping assemblies, especially to torsion damping assemblies which can be installed between the internal combustion engine and the change-speed transmission of a motor vehicle. Somewhat similar torsion damping assemblies are disclosed in the commonly owned copending patent application Ser. No. 669,657 of Oswald Friedmann for "Torsion damping assembly for motor vehicles" as well as in several other pending patent applications of the assignee.

Torsion damping assemblies of the type to which the present invention pertains are often used in motor vehicles to absorb shocks, especially to compensate for fluctuations of torque between the crankshaft of the internal combustion engine and the input shaft of the change-speed transmission. Such torsion damping assemblies normally comprise a composite flywheel having several coaxial flywheels which are rotatable within limits relative to each other against the opposition of one or more yieldable dampers, one of which receives torque from the engine, and the other of which transmits torque to the transmission by way of a friction clutch. The damper or dampers can include energy storing elements in the form of coil springs, other types of springs and/or friction generating units.

OBJECTS AND SUMMARY OF THE INVENTION

An object of the invention is to provide a novel and improved torsion damping assembly which is simpler, more compact and less expensive but more reliable and more versatile than heretofore known torsion damping assemblies.

Another object of the invention is to provide a torsion damping assembly which takes up little room between the crankshaft of the engine and the input shaft of the change-speed transmission in a motor vehicle.

A further object of the invention is to provide a torsion damping assembly which can stand longer periods of use than conventional assemblies.

An additional object of the invention is to provide a torsion damping assembly which comprises a small number of relatively simple and inexpensive parts, wherein a defective part can be readily replaced with little loss in time, and which can be furnished in any one of a practically infinite number of sizes and shapes to be ideally suited for installation in a particular motor vehicle.

Still another object of the invention is to provide a torsion damping assembly wherein only those portions of various components which are actually subject to extensive wear must be made of highly wear-resistant material and which can be used as a superior substitute for heretofore known torsion damping assemblies in motor vehicles or for other purposes.

A further object of the invention is to provide novel and improved dampers for use in the above outlined torsion damping assembly.

Another object of the invention is to provide novel and improved flywheels for use in the above outlined torsion damping assembly.

An additional object of the invention is to provide the torsion damping assembly with novel and improved means for establishing a torque transmitting connection between its dampers.

The invention is embodied in a torsion damping assembly which can be used with particular advantage as a means for taking up and compensating for fluctuations of torque which is transmitted between the crankshaft of the internal combustion engine and the input element of the change-speed transmission in a motor vehicle. The improved torsion damping assembly comprises a plurality of flywheels including a first flywheel which can be attached directly to the crankshaft to receive torque from the engine and a coaxial second flywheel which serves to transmit torque from the first flywheel to the input element of the transmission, for example, by way of a friction clutch. The first and second flywheels are rotatable within limits relative to each other and the torsion damping assembly further comprises a plurality of torsion damper means including first and second torsion damper means which are interposed between and serve to yieldably oppose angular movements of the first and second flywheels relative to each other. The first and second damper means respectively comprise a first and a second pair of discs which are spaced apart from each other, as considered in the axial direction of the first and second flywheels. The discs of the first pair share the angular movements of one of the first and second flywheels, and the discs of the second pair share the angular movements of the other of the first and second flywheels. The first and second damper means further comprise a common torque transmitting component (such as a flat plate-like body or flange) which is disposed between the discs of the first and second pairs. The torque transmitting component (hereinafter called flange for short) preferably constitutes the output element of the second damper means (whose input element is then constituted by the discs of the second pair) and the input element of the first damper means (whose output element is then constituted by the discs of the first pair). The flange preferably overlies portions of or the entire discs of the first and second pairs, as considered in the radial direction of the first and second flywheels, and the entire first damper means can be disposed inwardly of the second damper means, as considered in the radial direction of the flywheels. Thus, the discs of at least one of the two pairs of discs can be disposed at least in part inwardly of the discs of the other pair of discs, as considered in the radial direction of the flywheels. This entails a considerable reduction of the axial length of the torsion damping assembly. The flange extends radially of the first and second flywheels and outwardly beyond the one pair of discs. Means is provided (such means can include distancing elements in the form of rivets, pins, bolts, studs or the like) for non-rotatably securing the discs of the first pair to the one flywheel and the discs of the second pair to the other flywheel. The arrangement is or can be such that the discs of the first pair rotate with the second flywheel and the discs of the second pair rotate with the first flywheel. Means (e.g., diaphragm springs or the like) can be provided to establish a form locking connection between the flange and the discs of the first and/or second pair.

While it is presently preferred to non-rotatably secure the discs of the first pair to the second flywheel and the discs of the second pair to the first flywheel, it is equally within the purview of the invention to non-rotatably secure the discs of the first and second pairs to the first and second flywheels, respectively.

The second damper means further comprises means for clamping the flange between the discs of the first or second pair (such clamping means can constitute the aforementioned means for form-lockingly connecting the flange to the discs of the first or second pair). The clamping means can comprise a friction generating device which is interposed between the flange and at least one disc of the second pair.

In accordance with one presently preferred embodiment of the improved torque damping assembly, the second damper means further comprises means for fixedly securing one disc of the second pair to the other flywheel while the other disc of the second pair of discs is movable axially of the one disc and of the other flywheel. Such other disc and/or the one disc is preferably provided with means for holding the one disc of the second pair of discs against rotation with reference to the one disc and the other flywheel. To this end, one disc of the second pair can be provided with at least one aperture and the other disc of the second pair has a projection (e.g., in the form of a lug which extends in substantial parallelism with the common axis of the flywheels) which is received in the aperture and serves to hold the discs of the second pair against rotation relative to each other. The projection is preferably an integral part of the respective disc, and such disc can be the disc which is fixedly secured to the other flywheel or the other disc of the second pair, i.e., the disc having the projection or projections can be fixedly secured to the other flywheel or is movable, within limits, axially of the other flywheel. The projection or projections preferably extend from the outermost portion of the respective disc, as considered in the radial direction of the flywheels.

The means for biasing the axially movable disc of the second pair of discs against the other disc (which is or can be fixedly secured to the other flywheel) can comprise a diaphragm spring or other suitable resilient means reacting against the other flywheel and bearing against the axially movable disc of the second pair. The other flywheel can be provided with suitable centering means (e.g., a shoulder which surrounds a portion of or the entire diaphragm spring) for centering the resilient means with reference to the common axis of the flywheels. If the resilient means is or includes a diaphragm spring, the latter is preferably slotted or recessed in the region of the shoulder.

The aforementioned projection or projections of the one or the other disc of the second pair of discs can extend through suitable openings (e.g., tooth spaces or otherwise configurated recesses or cutouts) of the flange. The extent to which the flange and the discs of the second pair are movable relative to each other about the common axis of the flywheels can be determined by the dimensions of the opening or openings in the flange, as considered in the circumferential direction of the flywheels. Thus, the surface which surrounds at least one of the openings in the flange can cooperate with the respective projection to determine the maximum extent of angular movability of the flange and the discs of the second pair relative to each other.

The flange is or can be formed with radially outwardly extending arms or teeth which have limited freedom of angular movement relative to the discs of the second pair about the common axis of the flywheels. The aforementioned projections of one disc of the second pair then alternate with the arms of the flange to limit the extent of angular movability of the flange and the discs of the second pair relative to each other.

The second damper means can comprise deformable energy storing means in the form of coil springs or blocks containing rubber or another suitable elastomeric material which are installed in registering windows of the discs of the second pair. The aforementioned arms of the flange are then arranged to deform the energy storing means in response to angular movement of the flange relative to the discs of the second pair and/or vice versa. The windows in one disc of the second pair register, at least in part, with the windows in the other disc of the second pair, as considered in the axial direction of the flywheels. The arrangement may be such that the flange and the discs of the second pair are angularly movable relative to each other through a first angle without any or without any appreciable deformation of the energy storing means, and through an additional angle with attendant deformation of the energy storing means. Such energy storing means can constitute the means for limiting the extent of angular movability of the flange and the discs of the second pair relative to each other. The energy storing means can comprise a plurality of coil springs and/or elastically deformable blocks which are spaced apart from each other, as considered in the circumferential direction of the flywheels.

If the flange is formed with radially outwardly extending arms which are disposed between the discs of the second pair, such arms can carry friction generating or friction reducing linings or pads in contact with the one and/or the other disc of the second pair. Each arm can carry two pads one of which is in contact with one disc of the second pair and the other of which is in contact with the other disc of the second pair.

At least one of the first and second flywheels can be provided with means for centering the flange. Such centering means can comprise a rim which extends from the periphery of the respective flywheel and axially toward the other flywheel. At least a portion of the first and/or second damper means is preferably disposed within the confines of the rim, and the rim can extend axially beyond the second damper means.

If the means for biasing one disc of the second pair of discs axially of the flywheels and toward the other disc of the second pair (i.e., against the corresponding portion of the flange) comprises a diaphragm spring, the flywheel which shares all angular movements of the second pair of discs can be provided with means for centering the diaphragm spring. For example, such centering means can comprise a groove which is machined into or otherwise formed in the respective flywheel and is bounded by surfaces which serve to locate the diaphragm spring in the radial and axial directions of the flywheels.

One disc of the second pair of discs can be non-rotatably secured directly to an end face of the rim of the corresponding flywheel so that such flywheel and the disc which is secured thereto define a circular (e.g., annular) chamber which is surrounded by the rim, which receives the flange and which also receives the other disc of the second pair. The other disc of the second pair is or can be mounted for movement axially of the flywheels toward and away from the corresponding portion of the flange. In accordance with a presently preferred embodiment of the invention, the rim forms part of the flywheel which is secured to the crankshaft of the engine if the torque transmitting assembly is installed between the crankshaft and the input element of the change-speed transmission in a motor vehicle. If the axially movable disc of the second pair of discs is biased by a diaphragm spring so that it bears against the flange, the diaphragm spring can be installed to react against the first flywheel and to bear against the axially movable disc. The rim on the corresponding flywheel can serve as a means for centering the flange with reference to the common axis of the flywheels; to this end, the radially outwardly extending arms of the flange can abut directly against the internal surface of the rim. Alternatively, the second damper means can comprise friction generating or friction reducing means mounted on the arms of the flange and contacting the rim. Such friction generating or friction reducing means can constitute caps which are provided on at least some arms of the flange and are in contact with or closely adjacent to the rim to determine the position of the flange as considered in the radial direction of the flywheels. The caps can further serve to directly contact the discs of the second pair. At least one of the caps can include an elastic shock-absorbent portion and the other flywheel can include stop means cooperating with the shock-absorbent portion to limit the extent of angular movability of the flange and the discs of the second pair relative to each other about the common axis of the flywheels.

Instead of caps, the arms of the flange can carry yoke-like shoes which contact or are closely adjacent to the rim to center the flange between the first and second flywheels. Each shoe can comprise a radially extending end wall and the aforementioned stop means of the other flywheel then cooperate with the end walls of the shoes to limit the extent of angular movability of the flange relative to the other flywheel. The end walls of the shoes (or the entire shoes) can be mounted for movement relative to the respective arms, as considered in the circumferential direction of the flywheels, and the second damper means can further include energy storing means (e.g., blocks of elastomeric material) which are interposed between the end walls of the shoes and the respective arms to absorb the shocks which develop when the end walls strike against the adjacent stop means to terminate the angular movement of the flange and the other flywheel relative to each other.

The improved torsion damping assembly further comprises means for limiting the extent of angular movability of the flange and the one flywheel relative to each other. Such limiting means can comprise one or more distancing elements which serve to non-rotatably secure the discs of the first pair of discs to the one flywheel. The flange can be formed with recesses which receive portions of the distancing elements with certain freedom of angular movement of the flange and the one flywheel relative to each other. In other words, the surfaces surrounding the recesses of the flange can cooperate with the corresponding distancing elements to determine the extent of angular movability of the flange and the one flywheel relative to each other, i.e., to determine the maximum angle of effectiveness of the first damper means. The provision of recesses in the flange can result in the formation of teeth which alternate with the recesses (i.e., two teeth flank each recess and vice versa, as considered in the circumferential direction of the flywheels) and come into contact with the distancing elements in the one or the other end position of the flange relative to the one flywheel or vice versa. The recesses can be provided in the radially innermost portion of the flange.

The means for maintaining the flange in contact with the discs of the second pair can include undulate portions of at least one of these discs; such disc is then installed in prestressed condition so that its undulate portions bear against the flange and urge the latter against the other disc of the second pair of discs. In other words, the means for maintaining the flange in adequate friction generating contact with the discs of the second pair can constitute integral parts of at least one of the discs. Distancing elements can be provided to secure non-undulate portions of the one disc and the other disc to the corresponding flywheel so that such non-undulate portions and the other disc are maintained at a fixed axial distance from each other and also at a fixed axial distance from the respective flywheel.

The second damper means can comprise elastic clamps (preferably U-shaped clamps) which serve to bias the discs of the second pair against the respective sides of the flange. Such clamps can be spaced apart from one another, as considered in the circumferential direction of the flywheels. Each clamp can include a web which overlies the peripheries of the discs of the second pair and two radially inwardly extending cheeks or sidewalls which flank the discs of the second pair and urge such discs against the respective sides of the flange.

The other flywheel can be provided with projections in the form of axially parallel studs, pins or bolts which are received in complementary holes or bores of the discs of the second pair to hold these discs against rotation relative to the other flywheel. The discs of the second damper means are preferably provided with at least partially registering windows and the second damper means then further comprises energy storing elements in the form of coil springs and/or blocks containing or consisting of elastomeric material which are received in the registering windows of the discs and alternate with radially extending arms of the flange. The energy storing elements can cooperate with the arms of the flange to limit the extent of angular movability of the flange and the discs of the second damper means relative to each other about the common axis of the flywheels. At least one energy storing element can be mounted in such a way that it tends to turn the discs of the second damper means relative to each other and to thereby eliminate any play between such discs and the aforementioned projections. This can be readily achieved by staggering at least one pair of windows relative to each other, as considered in the circumferential direction of the flywheels, so that the energy storing element in such staggered windows tends to turn one of the discs which form part of the second damper means relative to the other disc. If the projections are bolts, rivets, pins or studs, they are anchored in the other flywheel.

It is further within the purview of the invention to provide the flange with holes which are disposed between the discs of the second pair and to install in such holes friction generating or friction reducing inserts which bear against the discs of the second pair, i.e., it is possible to cause parts which are provided on the flange to bear against the adjacent discs of the second pair rather than to provide means for biasing the discs of the second pair against the flange. The holes of the flange are preferably parallel to the common axis of the flywheels and the inserts extend from such holes into engagement with the discs of the second pair, i.e., the length of inserts in the holes can exceed the thickness of the flange, as measured in the axial direction of the flywheels. The arrangement may be such that at least a portion of each insert is movable in the respective hole and the surfaces which bound the holes serve to limit the movability of such inserts in the radial and/or circumferential direction of the flange. Each hole can receive a pair of coaxial inserts and each hole can accommodate energy storing means (e.g., one or more diaphragm springs) between the respective pair of inserts to urge at least one insert of the respective pair against a disc of the second damper means. The second damper means can further comprise connector means (e.g., rivets) for coupling the inserts of each pair to each other with limited freedom of movement in the axial direction of the flywheels. Each hole can include two coaxial blind holes which are separated from each other by a partition of the flange, and each partition is or can be provided with a passage for a portion of the respective connector means. Each insert can constitute a cylindrical or otherwise configurated friction generating member which is axially movably or fixedly installed in the respective blind bore. The arrangement may be such that one friction generating member of each pair of coaxial friction generating members is fixedly installed in the respective blind bore so that a portion thereof extends from the flange and contacts the adjacent disc of the second damper means, and that the other friction generating member of each pair is biased against the other disc of the second damper means by a diaphragm spring or another suitable energy storing element which reacts against the corresponding partition. Thus, in order to move nearer to the first friction generating member the axially movable friction generating member must be shifted against the opposition of the corresponding energy storing element.

The novel features which are considered as characteristic of the invention are set forth in particular in the appended claims. The improved torsion damping assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a fragmentary partly side elevational and partly sectional view of a fourth torsion damping assembly;

FIG. 7 is a fragmentary sectional view of a fifth torsion damping assembly;

FIG. 8 illustrates in section a portion of a disc in unstressed condition prior to insertion into the assembly of FIG. 7;

DESCRIPTION OF THE PREFERRED EMBODIMENTS

Figure 1:
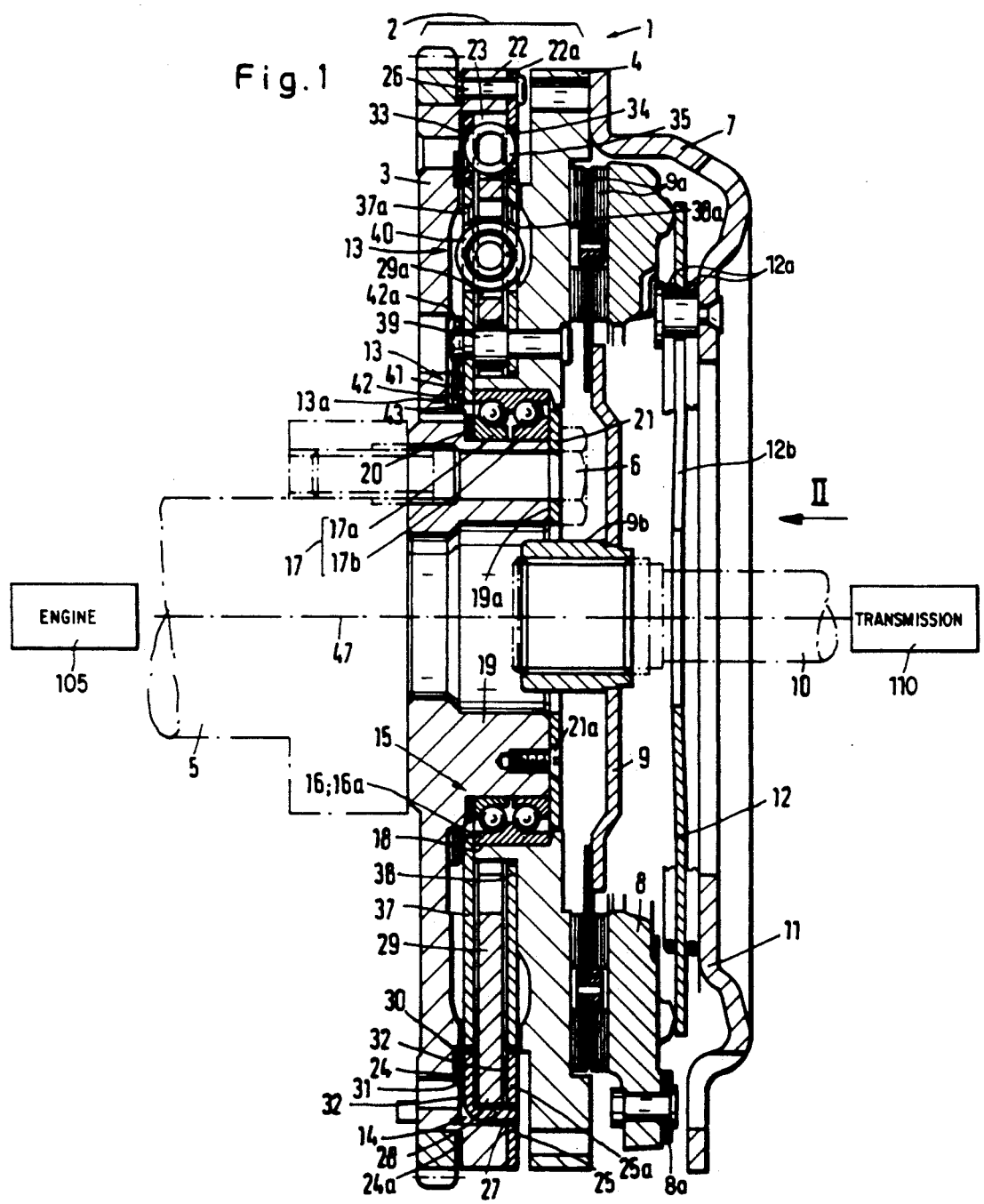
FIG. 1 is an axial sectional view of a torsion damping assembly which embodies one form of the invention.
Figure 2:
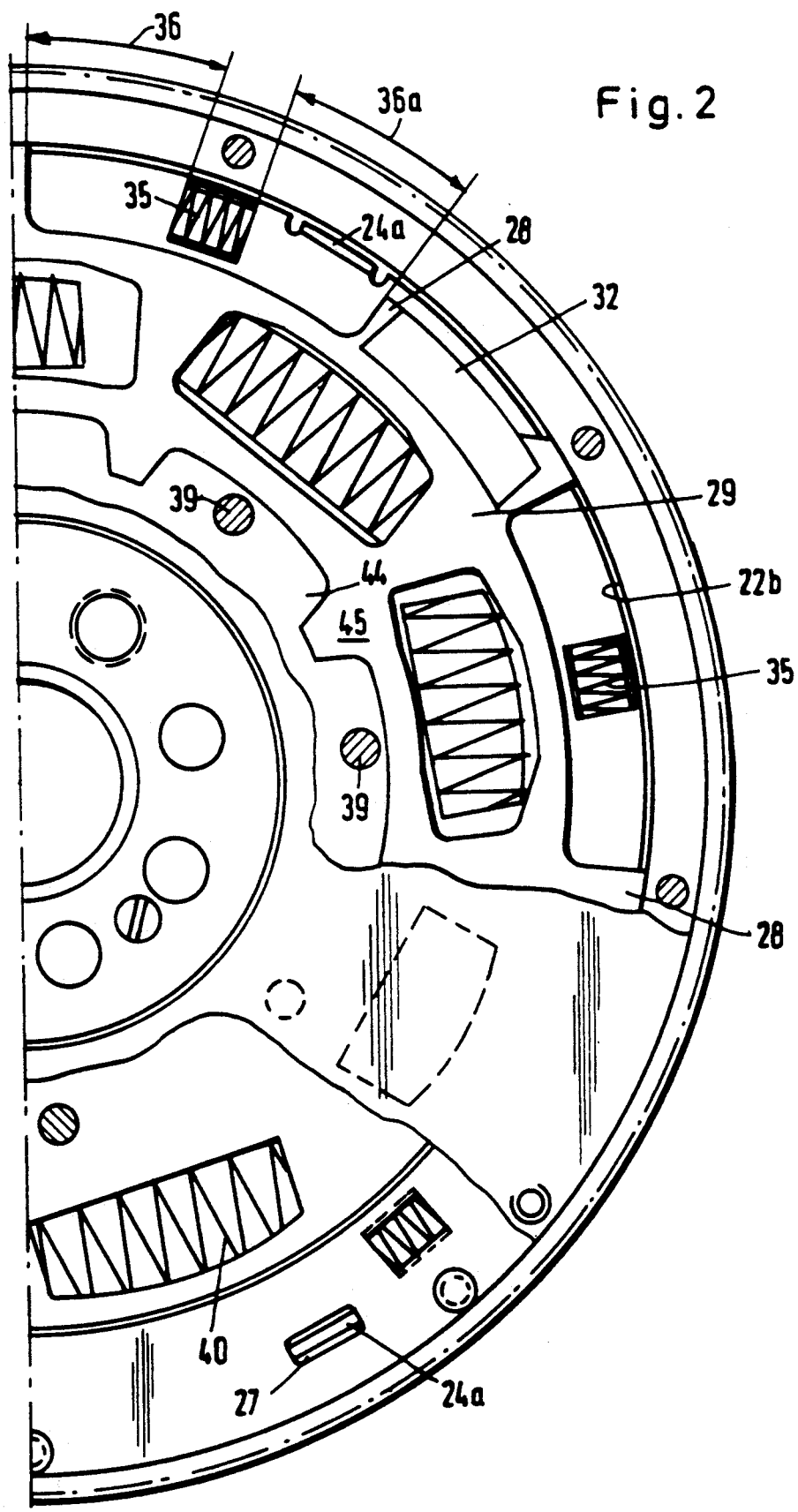
FIG. 2 is a fragmentary side elevational view as seen in the direction of arrow II in FIG. 1, with certain parts broken away.

The torsion damping assembly 1 which is shown in FIGS. 1 and 2 is installed between the crankshaft 5 of the internal combustion engine 105 and the input shaft 10 of the change-speed transmission 110 in a motor vehicle. The assembly 1 comprises a composite flywheel 2 which, in the embodiment of FIGS. 1 and 2, is assembled of two coaxial flywheels 3 and 4. The flywheel 3 is affixed to the crankshaft 5 by an annulus of bolts 6 or other suitable fasteners, and the flywheel 4 can transmit torque to the input shaft 10 of the transmission 110 through the medium of a friction clutch 7. The latter comprises a pressure plate 8 which is movable axially toward and away from the flywheel 4 and is non-rotatably but axially movably connected to the flywheel 4 and/or to the housing or cover 11 of the friction clutch 7 by a set of leaf springs 8a. The friction clutch 7 further comprises a diaphragm spring 12 which is tiltable between two ring-shaped wire+like seats 12a and whose outer marginal portion bears against the adjacent protuberances of the pressure plate 8 so as to urge the latter against the adjacent friction lining 9a of a clutch disc 9. The other lining 9a of the clutch disc 9 is then biased against and receives torque from the adjacent surface of the flywheel 4 which can be said to constitute an axially fixed pressure plate of the friction clutch 7. The clutch disc 9 is secured to a hub 9b which has internal splines receiving axially parallel external tongues of the input shaft 10 so that the latter is compelled to share all angular movements of the flywheel 4 when the clutch 7 is engaged. The means for disengaging the clutch 7 comprises an antifriction bearing (not shown) which can be moved axially into engagement with the inwardly extending prongs 12b of the diaphragm spring 12 so that the latter moves its outer marginal portion axially of and away from the flywheel 4 to thus interrupt the torque-transmitting connection between the flywheel 4 and the pressure plate 8 on the one hand and the friction linings 9a on the other hand.

The flywheels 3 and 4 of the composite flywheel 2 are rotatable within limits relative to each other, and such angular movements are opposed by two dampers including a first damper 13 and a second damper 14 which latter is mounted in series with the damper 13.

The torsion damping assembly 1 further comprises a bearing device 15 here shown as including an antifriction bearing 16 with two rows or annuli of spherical antifriction rolling elements. The one-piece outer race 16a of the bearing 16 is received in a centrally located recess 18 of the flywheel 4, and the two sections or halves 17a, 17b of the inner race 17 of the bearing 16 surround a centrally located protuberance 19 of the flywheel 3. The protuberance 19 extends into the recess 18 of the flywheel 4 and projects axially from that side of the major portion of the flywheel 3 which faces away from the crankshaft 5.

The sections 17a, 17b of the inner race 17 of the antifriction bearing 16 are biased axially toward each other by a prestressed energy storing device in the form of a diaphragm spring 20. The radially outermost portion of the diaphragm spring 20 reacts against a shoulder which is provided on the flywheel 3 and surrounds the protuberance 19, and the radially innermost portion of the spring 20 bears against the section 17a and urges it axially toward the section 17b whereby the latter abuts against a disc-shaped retainer 21 which is separably secured to the adjacent end face 19a of the protuberance 19 by a set of screws 21a or other suitable fastener means. As can be seen in FIG. 1, the diameter of the retainer 21 exceeds the diameter of the protuberance 19, and the radially outermost portion of the retainer 21 serves as a stop for the section 17b of the inner race 17. The diaphragm spring 20 ensures that the two annuli of rolling elements are received without play between the one-piece outer race 16a and the two-piece inner race 17 of the antifriction bearing 16 which constitutes a combined radial and thrust bearing for the flywheels 3 and 4.

In order to ensure that the rolling elements of the bearing 16 are received between the races 16a and 17 without any or without any appreciable play when the friction clutch 7 is in the process of being engaged or disengaged, the force of the spring 20 is greater than the force which is necessary to actuate the friction clutch. It has been found that the operation of the torsion damping assembly 1 is quite satisfactory if the force with which the spring 20 opposes a movement of the section 17a of the inner race 17 away from the section 17b is at least approximately twice the maximum force which is required to disengage the friction clutch 7.

The periphery of the flywheel 3 is provided with an axially extending ring-shaped projection or rim 22 which surrounds a chamber 23 for the first damper 13. A portion of the second damper 14 is also installed in the chamber 23 radially inwardly of the rim 22. The input element of the second damper 14 includes a group or set of two or more discs here shown as composed of two coaxial axially spaced-apart parallel discs 24, 25 which are non-rotatably affixed to the flywheel 3, i.e., which are arranged to share all angular movements of the crankshaft 5. The disc 25 is a ring-shaped washer which is fixedly secured to the end face 22a of the rim 22 by a set of rivets 26. The radially inwardly extending portion 25a of the disc 25 partially bounds the right-hand side of the chamber 23, as viewed in FIG. 1. The disc 24 is installed in the chamber 23 and has axially extending projections in the form of integral lugs 24a extending into apertures 27 of the disc 25 so that the latter holds the disc 24 against angular movement relative to the flywheel 3. The arrangement is such that the lugs 24a are movable axially in the respective apertures 27, i.e., the distance between the disc 25 and the main portion of the disc 24 is variable.

The space between the discs 24 and 25 of the second damper 14 receives radially outwardly extending teeth or arms 28 of an intermediate flywheel in the form of a flange 29, and the arms 28 are clamped between the adjacent portions of the discs 24, 25 by an energy storing device in the form of a diaphragm spring 30 reacting against the flywheel 3 and bearing against the disc 24 so that the latter is urged against the arms 28 and such arms are urged against the disc 25. As can be seen in FIG. 1, the radially outermost portion of the diaphragm spring 30 bears against the flywheel 3 in the chamber 23, and the radially innermost portion of the diaphragm spring 30 bears against the adjacent portion of the axially shiftable disc 24. The radially outermost portion of the diaphragm spring 30 is preferably slotted, i.e., the spring 30 can constitute a split ring, and such radially outermost portion of the spring 30 reacts against an annular centering shoulder 31 which is provided on the flywheel 3 in the chamber 23.

Friction generating linings in the form of arcuate segments 32 are bonded to both sides of each radially outwardly extending arm 28 to increase friction between the flange 29 and the discs 24, 25. The arms 28 of the flange 29 alternate (as viewed in the circumferential direction of the flywheels 3 and 4) with windows 33 and 34 which are respectively formed in the discs 24, 25. Each window 33 is in register with a window 34, and such pairs of registering windows receive energy storing elements in the form of coil springs 35. However, it is equally possible to employ energy storing elements in the form of springs made of hard rubber or the like. The coil springs 35 constitute abutments or stops for the radial arms 28 of the flange 29 and thus determine the extent of angular movability of the constituents of the second damper 14 relative to each other. The purpose of the spring 35 is to prevent strong impacts between the flange 29 and the discs 24, 25 of the damper 14 when the flange reaches the one or the other end position relative to the discs 24, 25. Each coil spring 35 has a central portion which is disposed between two neighboring radially outwardly extending arms 28 of the flange 29.

As can be seen in FIG. 2, which shows the damper 14 in an intermediate or neutral position, the energy storing coil springs 35 are separated from the nearest radial arms 28 of the flange 29 by clearances 36 and 36a which, together with the maximum extent of compression of the springs 35, determine the extent of angular movability between the input element (discs 24, 25) and the output element (flange 29) of the damper 14.

The flange 29 constitutes the input element of the first damper 13. The latter further comprises an output element in the form of two or more discs. The illustrated damper 13 has two discs 37, 38 which are disposed at the opposite sides of the flange 29 and are held at a fixed axial distance from each other by distancing elements 39 in the form of rivets which are anchored in the flywheel 4. The discs 37, 38 are disposed radially inwardly of the respective discs 24, 25 of the second damper 14. The disc 24 is at least substantially coplanar with the disc 37, and the disc 25 is at least substantially coplanar with the disc 38. The discs 37 and 38 are respectively provided with windows 37a, 38a which are located radially inwardly of the arms 28 of the flange 29 and register with windows 29a of the flange 29 to receive energy storing elements in the form of coil springs 40. These springs yieldably oppose angular movements of the flange 29 and the discs 37, 38 relative to each other.

The first damper 13 further includes a friction generating unit 13a which opposes each and every stage of angular movement of the flywheels 3 and 4 relative to each other. The friction generating unit 13a is installed between the disc 37 and the flywheel 3 and includes an energy storing member 41 in the form of a diaphragm spring installed between the disc 37 and a pressure transmitting ring 42. The latter urges a friction generating ring 43 against the friction wheel 3. The force which the diaphragm spring 41 applies to the disc 37 is taken up by the antifriction bearing 16. The pressure transmitting ring 42 has a slotted radially outermost portion 42a whose fingers alternate with the corresponding end portions of the distancing elements 39 to thus ensure that the ring 42 cannot rotate with reference to the flywheel 4.

The radially innermost portion of the flange 29 has arcuate recesses 44 (see FIG. 2) for portions of the distancing elements 39. The recesses 44 alternate with teeth 45 which cooperate with the distancing elements 39 to limit the extent of angular movability of the constituents of the first damper 13 relative to each other, i.e., the angular movability of the flange 29 and the flywheel 4 relative to one another. The distancing elements 39 actually cooperate with the surfaces surrounding the respective recesses 44 to determine the two end positions of the flywheel 4 and the flange 29 relative to one another.

The distribution of windows 37a, 38a in the discs 37, 38 and of the windows 29a in the flange 29 (as considered in the circumferential direction of these parts) is such that the coil springs 40 in the windows 29a, 37a, 38a impart to the damper 13 a multi-stage or stepped characteristic curve. In other words, the resistance which the coil springs 40 offer to angular displacement of the flange 29 and discs 37, 38 relative to each other varies stepwise in response to turning of the flange 29 with reference to the discs 37, 38 and/or vice versa.

The axis of the flange 29 is located on or close to the common axis 47 of the flywheels 3, 4 and bearing 16. This is ensured by the radially outwardly extending arms 28 which abut against the internal surface 22b of the rim 22 which forms a part of or is rigidly connected to the flywheel 3.

FIG. 2 shows the torsion damping assembly 1 in its neutral position. In response to a change of moment, the flywheel 3, the discs 24, 25 and the flange 29 turn relative to the flywheel 4 and discs 37, 38 to stress the coil springs 40 whereby the resistance to rotation of the flywheel 3 relative to the flywheel 4 increases stepwise due to differences in the dimensions of windows 37a, 38a in the discs 37, 38 and the windows 29a in the flange 29. Such angular displacement of the flywheel 3, discs 24, 25 and flange 29 relative to the flywheel 4 and discs 37, 38 continues until the torque which is transmitted by the coil springs 40 (which have undergone progressing compression and have stored additional energy) exceeds the friction moment which can be transmitted by the second damper 14. If the angular displacement of the flywheel 3 relative to the flywheel 4 continues in the same direction, the second damper 14 begins to slip so that the flange 29 ceases to turn relative to the flywheel 4 until the coil springs 35 reach and bear against the flanks of arms 28 on the flange 29. The arms 28 then effect a further angular displacement of the flange 29 (with the flywheel 3) relative to the flywheel 4 whereby the coil springs 35 store additional energy. The angular movement of the flywheel 3 and flange 29 relative to the flywheel 4 is terminated when the teeth 45 of the radially innermost portion of the flange 29 strike against the adjacent distancing elements 39.

As can be seen in FIG. 2, the configuration of arms 28 on the flange 29 is such that they engage the coil springs 35 for the purpose of determining the maximum extent of angular displacement of the input elements 24, 25 and output element 29 of the second damper 14 relative to each other. However, it is also within the purview of the invention to change the configuration of the arms 28 so that the extent of angular displacement of the discs 24, 25 relative to the flange 29 is determined by the arms 28 and/or by the lugs 24a of the disc 24. This can be accomplished by imparting to the arms 28 (with reference to the lugs 24a and coil springs 35) a shape which ensures that, as considered in the circumferential direction of the flywheels 3 and 4, the coil springs 35 first absorb the fluctuations of torque and thereupon cooperate with the lugs 24a to limit the extent of angular movement of the discs 24, 25 and flange 29 relative to each other. It is equally possible to dispense with the coil springs 35 and to rely exclusively on the lugs 24a as a means for limiting the extent of angular movement of the input and output elements of the second damper 14 relative to each other.

The means for limiting the extent of angular movability of the flange 29 and the discs 24, 25 relative to each other can include surfaces surrounding suitable openings (not specifically shown) in the flange. Such openings can receive the projections 24a of the disc 24 with a certain amount of play, as considered in the circumferential direction of the flywheels 3 and 4, and this play determines the extent to which the flange 29 can turn relative to the discs 24, 25 and/or vice versa. All that is necessary is to extend the projections radially inwardly, as viewed in FIG. 2, so that they can be engaged by the adjacent arms 28 of the flange 29 when the latter turns relative to the discs 24 and 25. The openings of the flange 29 (for the projections 24a of the disc 24) can be radially outwardly open recesses or cutouts or closed slots whose length (as considered in the circumferential direction of the flywheel 3) determines the extent of angular movability of the flange 29 and discs 24, 25 relative to each other.

The torsion damping assembly 1 of FIGS. 1 and 2 can be modified in a number of ways, depending on the specific circumstances of its use. For example, the discs 24, 25 of the damper 14 can be caused to bear directly against the adjacent sides of teeth 28 on the flange 29 without the interposition of any friction generating or friction reducing linings. This depends on the desired magnitude of slip torque between the input and output elements of the damper 14. However, and as a rule, the damper 14 will comprise friction generating linings between the flange 29 and at least one of the discs 24, 25. The composition of these linings will determine the magnitude of slip torque, and such torque also depends on the selected bias of the diaphragm spring 30.

Furthermore, the disc 25 which is secured to the rim 22 of the flywheel 3 by the rivets 26 can be provided with axially parallel projections or lugs which extend into suitable apertures of the disc 24. Such projections can be provided in addition to or in lieu of the projections 24a. The projections of the disc 24 and/or 25 may but need not be integral parts of the respective disc; for example, they may be welded, riveted or otherwise affixed to the corresponding disc.

Still further, the positions of the dampers 13 and 14 can be reversed, i.e., the discs 24, 25 can be disposed radially inwardly of the discs 37, 38. Also, the discs 24, 25 can be secured to the flywheel 4, and the discs 37, 38 are then secured to the flywheel 3.

As already mentioned above, the projections 24a can be caused to extend radially inwardly beyond the positions which are shown in FIG. 2 so that they cooperate with the arms 28 of the flange to determine the maximum extent of angular movability of the discs 24, 25 and the flange 29 relative to each other. However, and especially if the improved torsion damping assembly 1 already includes other means for limiting the extent of such angular movability of the parts 24, 25 and 29 relative to each other (for example, the arms 28 of the flange 29 and the coil springs 35 in the windows 33, 34 of the discs 24, 25), the projections 24a are preferably disposed radially outwardly of the arms 28 so that they can bypass the flange or vice versa when the discs 24, 25 and the flange 29 are caused to turn relative to each other about the common axis of the flywheels 3 and 4.

The bias of the diaphragm spring 30 can be selected with a view to ensure the generation of desirable slip torque between the discs 24, 25 and the flange 29. It is also possible to provide means for adjusting the bias of the diaphragm spring 30 so as to vary the slip torque until it assumes an optimum value.

The outermost marginal portion of the diaphragm spring 30 is preferably formed with radial slots or cutouts. Alternatively, the diaphragm spring 30 can constitute a split ring. The just described types of diaphragm springs are preferred at this time because they can be mass-produced at a reasonable cost by rolling a strip of metallic material. As used in this description and in the claims, the term "diaphragm spring" is intended to denote a conventional circumferentially complete diaphragm spring, a diaphragm spring which constitutes a split ring, a diaphragm spring which has radially extending slots or cutouts in its radially outermost portion or any equivalent energy storing element. The utilization of diaphragm springs in the form of split rings is desirable and advantageous on the additional ground that such split rings can be readily installed within the confines of the centering shoulder 31 in the flywheels 3.

The coil springs 35 can be dimensioned and the length of the windows 33, 34 in the discs 24, 25 can be selected in such a way that the coil springs undergo at least some deformation and store additional energy in response to each and every stage of angular movement of the flange 29 and discs 24, 25 relative to each other. Alternatively, and as actually shown in FIG. 2, the arms 28 of the flange 29 begin to compress the springs 35 only during the last stage of angular movability of the flange 29 and the discs 24, 25 relative to each other. In other words, the assembly 1 is constructed and operates in such a way that the discs 24, 25 and the flange 29 can turn relative to each other through a first angle without any deformation of the coil springs 35 (or without any additional deformation if the coil springs 35 are installed in prestressed condition) and thereupon through a second angle with attendant progressively increasing deformation of the coil spring 35 until the convolutions of each spring 35 (or at least one of these springs) are immediately adjacent to each other and the fully compressed spring or springs 35 then constitute stops which prevent any additional angular movements of the discs 24, 25 and the flange 29 relative to each other. As shown in FIG. 2, the dimensions of the coil springs 35 and of the spaces or openings between the arms 28 of the flange 29 can be selected in such a way that the coil springs 35 undergo compression as a result of engagement with the adjacent arms 28 only during a relatively small (final) stage of angular displacement of the flange 29 and the discs 24, 25 relative to each other. The springs 35 prevent or reduce the likelihood of damage to the parts of the damper 14 because they constitute yieldable cushions which become effective not later than shortly before the flange 29 and the discs 24, 25 reach the limit of their angular movement relative to each other. This also entails a pronounced reduction of noise.

In the embodiment of FIGS. 1 and 2, the rim 22 of the flywheel 3 does not extend axially beyond 30 the entire second damper 14 because the disc 25 of this damper is riveted to the end face 22a of the rim. However, and as shown in FIGS. 3-5 and 9, the rim of the flywheel which receives torque from the crankshaft of the engine can extend axially beyond the entire second damper so that both dampers are disposed entirely within the confines of the rim.

Figure 3:
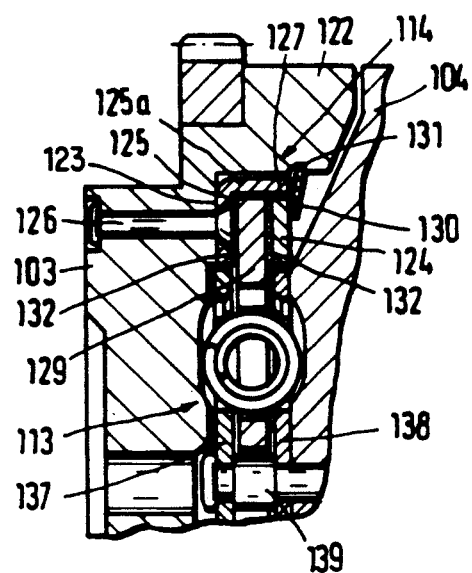
FIG. 3 is a fragmentary axial sectional view of a second torsion damping assembly employing a modified damper.

FIG. 3 shows a portion of a modified torsion damping assembly wherein the flywheel 103 is rigidly connected to the disc 125 by rivets 126 or analogous fasteners. The radially outermost portion of the disc 125 has axially extending projections or lugs 125a received in apertures 127 which are provided in the disc 124. The disc 124 is adjacent to the flywheel 104 and the apertures 127 are provided close to its peripheral surface. The width of the apertures 127 (as considered in the circumferential direction of the flywheels 103 and 104) is such that the discs 124 and 125 cannot rotate relative to each other. However, the disc 124 is movable axially toward and away from the disc 125. The discs 124, 125 constitute the composite input element of the second damper 114 whose output element is a flange 129 which is disposed between the discs 124, 125. The flange 129 carries two ring-shaped (one piece or composite) friction generating linings 132 which are in contact with the adjacent discs 124, 125.

The flange 129 constitutes the input element of the first damper 113 whose output element includes two discs 137, 138 which are fixedly secured to each other by distancing elements 139 in the form of rivets anchored in the flywheel 104. The dampers 113 and 114 are installed in a chamber 123 which is provided radially inwardly of the axially extending ring-shaped rim 122 of the flywheel 103. The internal surface of the rim 122 is formed with a groove 131 which receives the radially outermost portion of a diaphragm spring 130 so that the latter is held against axial and radial movement relative to the rim 122. The radially innermost portion of the diaphragm spring 131 bears against the adjacent portion of the disc 124 and urges the latter axially against the corresponding friction generating lining 132 of the flange 129 whereby the other friction generating lining 132 of the flange 129 bears against the axially fixed disc 125 on the flywheel 103. In order to facilitate the installation of the diaphragm spring 130 in the groove 131, the radially outermost portion of the spring 130 is preferably slotted to allow for a reduction of its outer diameter prior to insertion into the groove 131. The slip torque of the second damper 114 is determined by the bias of the diaphragm spring 130 and by the friction coefficients of friction generating linings 132.

All remaining parts of the torsion damping assembly which embodies the structure of FIG. 3 are or can be identical with those of the assembly 1 which is shown in FIGS. 1 and 2. It will be seen that, in contrast to the second damper 14 of FIGS. 1 and 2, the damper 114 of FIG. 3 has a disc 124 which does not have any axially extending lugs and which is axially movably mounted on the flywheel 104 (corresponding to the flywheel 4 of FIGS. 1-2). The lugs (125a) are provided on the disc 125 which is riveted to the flywheel 103 (corresponding to the flywheel 3 of FIGS. 1 and 2).

Figure 4:
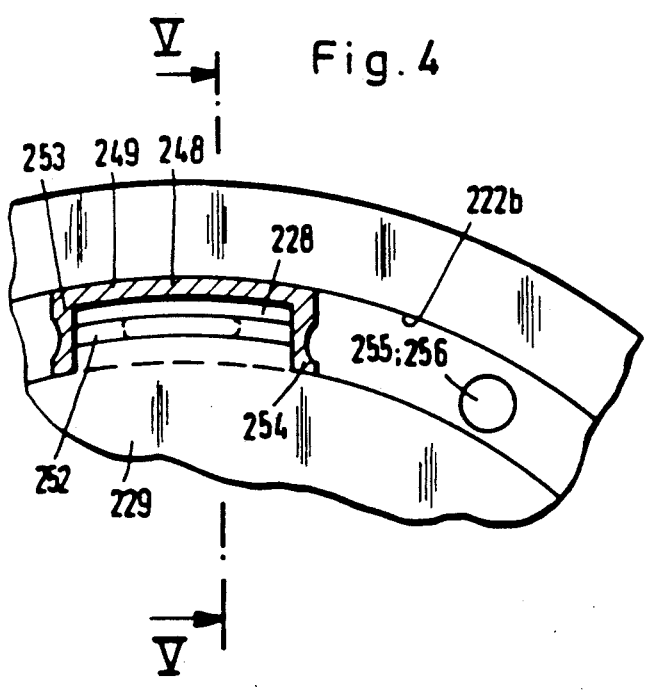
FIG. 4 is a fragmentary partly side elevational and partly sectional view of a third torsion damping assembly.
Figure 5:
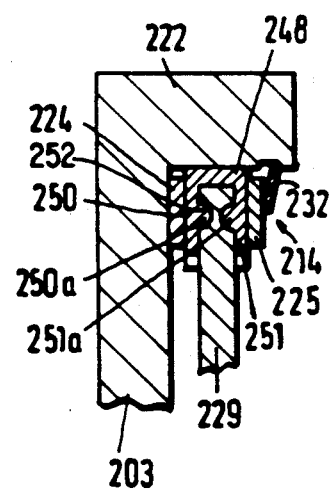
FIG. 5 is a sectional view as seen in the direction of arrows from the line V—V of FIG. 4.

FIGS. 4 and 5 show a portion of a third torsion damping assembly wherein all such parts which are identical with or clearly analogous to the corresponding parts of the assembly 1 of FIGS. 1 and 2 are denoted by similar reference characters plus 200. The second damper 214 of FIGS. 4 and 5 is adjacent to the internal surface 222b of the peripheral rim 222 on the flywheel 203. The flange 229 has radially outwardly extending arms 228 which carry friction generating slidable extensions 248 adjacent to the internal surface 222a and serving to center the flange 229 relative to the flywheel 203 and the other flywheel (not shown). The extensions 248 constitute the radially outermost portions or webs of substantially U-shaped caps or hoods 249 which are slipped onto the arms 228 and further include sidewalls 250, 251 flanking the respective arms 228. Each sidewall 250 is disposed between the respective arm 228 and the disc 224, and each sidewall 251 is disposed between the respective arm 228 and the disc 225. The discs 224, 225 constitute the input element of the second damper 214. A diaphragm spring 232 is mounted in an internal groove of the rim 222 in the same way as described for the diaphragm spring 130 of FIG. 3 and serves to bias the disc 225 against the sidewall 251 and to thereby bias the sidewall 250 against the disc 224 so as to generate the required moment of friction.

In order to prevent separation of the caps 249 from the respective arms 228 under the action of centrifugal force, at least one of the sidewalls 250, 251 is provided with detent means which prevents its movement radially outwardly (although such movement is or can be prevented by the rim 222). In the embodiment of FIGS. 4 and 5, each of the sidewalls 250, 251 is provided with male detent means in the form of a circumferentially extending bead or male detent member 250a, 251a which is held by snap action in a complementary socket 252 at the corresponding side of the respective arm 228. In order to facilitate the slipping of the caps 249 onto the respective arms 228, the length of each male detent member 250a, 251a (as considered in the circumferential direction of the flange 229) is only a small fraction of the length of the respective socket 252. The male detent members 250a, 251a snap into the respective sockets 252 due to innate elasticity of the caps 249. Each socket 252 extends along the full length of the corresponding arm 228, as considered in the circumferential direction of the flange 229. The portions 253, 254 of each cap 249 constitute elastic and shock-absorbent parts of such caps which cooperate with abutments or stops 255 on the flywheel 203 to limit the extent of angular displacement of the input and output elements of the second damper 214 relative to each other. The abutments 255 are secured to the flywheel 203 in such a way that they share its angular movements relative to the other flywheel. Each of the abutments 255 can constitute a pin or bolt which is anchored in the flywheel 203 and extends into registering bores or holes 256 of the discs 224, 225 to hold such discs against angular movement with reference to the flywheel 203.

An advantage of the extensions 248 is that they reduce the likelihood of interference with the operation of the first damper as a result of undesirable friction between certain parts of the torsion damping assembly. To this end, the extensions 248 can be made of a friction reducing material so that they can adequately center the flange 229 within the rim 222 but are in minimal frictional engagement with the flywheel 203. Elimination of the likelihood of interference with proper operation of the first damper is particularly desirable and advantageous during that stage or those stages of the operation of the first damper (i.e., during that stage or those stages of angular movement of the flywheels relative to each other) when the torque which is being transmitted between the two flywheels is relatively small.

The extensions 248 can be made of a first (friction reducing) material and the sidewalls 250 and 251 can be made of a second (friction generating) material.

FIG. 6 shows a portion of a fourth torsion damping assembly wherein the flange 329 is centered in the chamber of the flywheel 303 in a different way. The arms 328 of the flange 329 are provided with yoke-like centering shoes 349 having end walls 353, 354 which overlie the flanks of the respective arms 328 (i.e., those end faces of the arms 328 which are disposed in planes extending radially of the flywheel 303 and including or parallel with the common axis of the flywheels). The end walls 353, 354 cooperate with pin- or bolt-shaped abutments or stops 355 which are provided on the flywheel 303 to limit the extent of angular movability of the flange 329 relative to this flywheel. The abutments 355 preferably extend through registering holes of the two discs (corresponding to the discs 224, 225 of FIGS. 4 and 5) of the second damper 314. Such discs are disposed at the opposite sides of the flange 329. The end walls 353, 354 extend radially inwardly from the longitudinal end portions of a web 349a which constitutes the median part of the respective shoe 349 and is immediately adjacent to the internal surface 322b of the rim 322 on the flywheel 303. The distance between the end walls 353, 354 of each shoe 349 exceeds the length of the respective arm 328 (as considered in the circumferential direction of the flywheel 303) by the value 2× which suffices to allow for the insertion of energy storing devices in the form of elastically deformable pads 357 made of hard rubber or a material exhibiting similar elastomeric properties. Each pad 357 is inserted between the inner side of the end wall 353 or 354 and the respective end face of the corresponding arm 328. The purpose of the pads 357 is to absorb the shocks when the end walls 353, 354 strike against the adjacent abutments or stops 355 and/or vice versa as well as to reduce noise. Each of the shoes 349 can be made of a metallic material or of any other material which exhibits the required frictional and sliding properties.

The stops 355 can be replaced with stops which extend radially inwardly from the rim 322 of the flywheel 303 or with energy storing coil springs or blocks corresponding to the energy storing elements 35 of FIG. 2. For example, the discs (not shown) of the damper 314 can be provided with registering windows for coil springs which replace the stops 355 and . cooperate with the end walls 354 of the adjacent shoes 349 to limit the extent of angular movability of the flange 329 and the discs of the damper 314 relative to each other as well as to minimize noise on impact of the end walls 354 against such coil springs and/or vice versa. The energy storing devices 357 are optional if the stops 355 are replaced with coil springs or with blocks of elastomeric material.

FIGS. 7 and 8 show a portion of an additional torsion damping assembly wherein the second damper 414 comprises two discs 424, 425 which are non-rotatably connected to each other and to the flywheel 403 by distancing elements in the form of pins, bolts or rivets 455. The discs 424, 425 are disposed at the opposite sides of the radially outwardly extending arms 428 of a flange 429 and each side of each arm 428 carries a friction generating lining 432 corresponding to the linings 132 shown in FIG. 3.

As can be seen in FIG. 8, the disc 425 has undulate portions (indicated at 425a) at both sides of each hole or bore 455a for one of the distancing elements 455 (as considered in the circumferential direction of the disc 425). When the disc 425 is properly mounted in the torsion damping assembly, the undulate portions 425a are flattened (i.e., the disc 425 is installed in prestressed condition, as considered in the axial direction of the discs 424, 425). This can be readily seen in FIG. 7 wherein the disc 425 is flat, i.e., its plane is disposed at right angles to the axis of the flywheel 403 and is parallel to the plane of the flat disc 424. The prestressed disc 425 biases the arms 428 of the flange 429 against the disc 424 to generate the required moment of friction when the flange 429 turns relative to the discs 424, 425 and/or vice versa. The means for limiting the extent of angular movement of the flange 429 relative to the discs 424, 425 comprises energy storing elements in the form of coil springs 435 which are inserted into registering windows of the discs 424, 425 substantially in the same way as described for the coil springs 35 of FIGS. 1 and 2. Each coil spring 435 is flanked by two arms 428, and the flange 429 ceases to turn relative to the discs 424, 425 when each of the coil springs 435 is engaged and compressed by one of the adjacent arms 428.

The utilization of an undulate disc 425 which is made of a suitable elastomeric material (such as spring steel) renders it possible to dispense with discrete biasing means (such as the diaphragm spring 30 of FIG. 1) for urging the discs 424, 425 axially against the respective sides of the arms 428.

The undulate portions 425a alternate with those (second) portions of the disc 425 which are held at a fixed distance from the disc 424 (and also at a given fixed distance from the flywheel 403) by the corresponding distancing elements 455.

Figure 10:
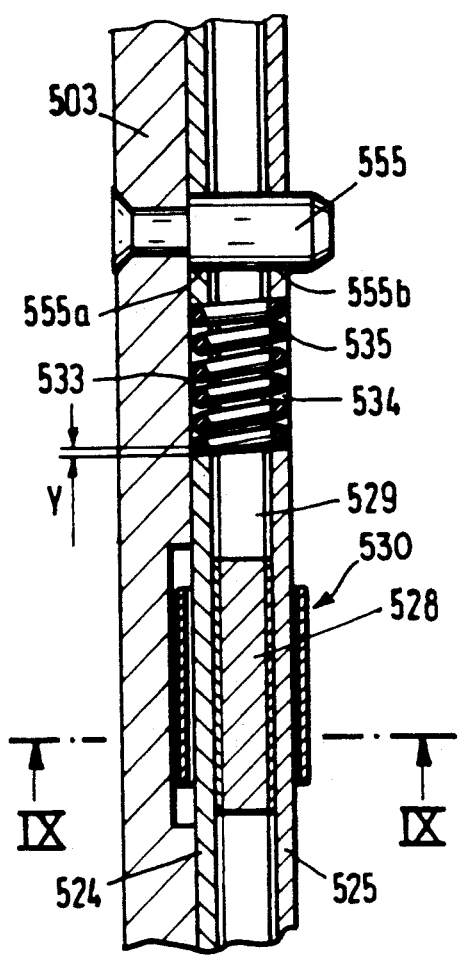
FIG. 10 is another sectional view of the sixth torsion damping assembly.
Figure 9:
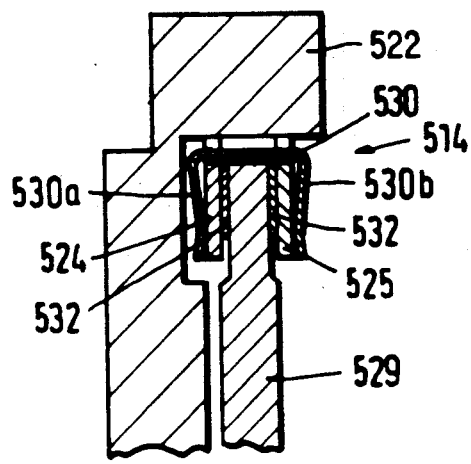
FIG. 9 is a fragmentary axial sectional view of a sixth torsion damping assembly, the section being taken in the direction of arrows as seen from the line IX—IX in FIG. 10.

FIGS. 9 and 10 show a portion of still another torsion damping assembly wherein the damper 514 comprises two discs 524, 525 which are disposed at the opposite sides of the radially outwardly extending arms 528 of a flange 529. The means for biasing the discs 524, 525 against the adjacent friction generating linings 532 at the corresponding sides of the arms 528 comprises a set of U-shaped elastic clamps 530 which are spaced apart from each other, as considered in the circumferential direction of the flywheel 503. Each of the U-shaped clamps 530 has a web which is inwardly adjacent to the rim 522 of the flywheel 503 and two sidewalls or cheeks 530a and 530b which are respectively adjacent to the outer sides of the discs 524 and 525 and urge such discs toward each other, i.e., toward the corresponding friction generating linings 532 to generate the required moment of friction. The means for holding the discs 524, 525 against rotation relative to each other and relative to the flywheel 503 comprises distancing elements 555 in the form of rivets, studs, bolts or pins which are anchored in the flywheel 503 and extend into suitable complementary holes or bores 555a, 555b of the discs 524, 525.

The discs 524, 525 are respectively formed with windows 533, 534 for energy storing elements in the form of coil springs 535 which limit the extent of angular movability of the flange 329 and discs 524, 525 (i.e., of the output and input elements of the damper 514) relative to each other. Each of the coil springs 535 is compressed by one of the neighboring arms 528 when the angular movement of the flange 529 relative to the discs 524, 525 or vice versa is to be terminated.

As can be seen in FIG. 10, the windows 533 of the disc 524 in assembled condition of the torsion damping assembly including the damper 514 are angularly offset relative to the windows 534 of the disc 525 by a distance Y to thus ensure a non-symmetrical or one-sided stressing of the coil springs 535. Such one-sided stressing of the coil springs 535 is desirable and advantageous because it ensures that the coil springs 535 eliminate eventual play between the distancing elements 555 and the surfaces surrounding the respective holes 555a, 555b in the discs 524 and 525 by urging the discs 524, 525 to turn relative to each other about the common axis of the flywheels. Such elimination of play between the distancing elements 555 and the discs 524, 525 has been found to enhance the damping action of the damper 514 to a considerable extent, i.e., the damper 514 is effective as soon as and whenever the flange 529 changes its angular position relative to the discs 524, 525 and/or vice versa, even to a minute extent. Furthermore, such elimination of play between the distancing elements 555 on the one hand and the discs 524, 525 on the other hand reduces the likelihood of noise generation when the damping assembly employing the structure of FIGS. 9 and 10 is in actual use.

Figure 11:
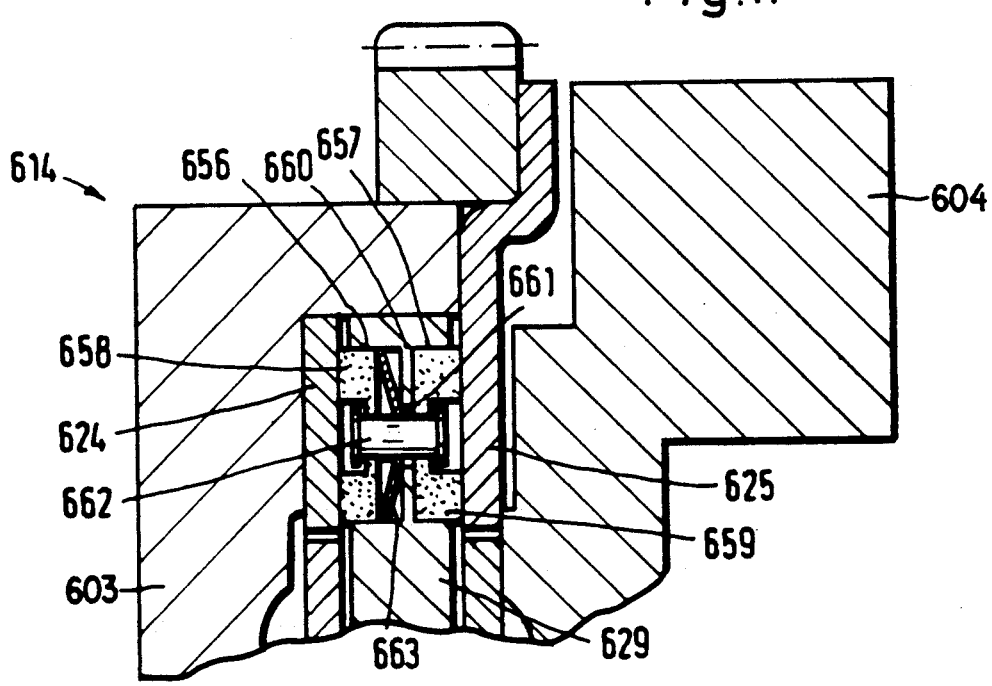
FIG. 11 is a fragmentary axial sectional view of still another torsion damping assembly.

Referring now to FIG. 11, there is shown a portion of an additional torsion damping assembly including a damper 614 whose output element is a torque transmitting component or flange 629 disposed between the discs 624, 625 of the composite input element. Each side of the flange 629 is provided with an annulus of blind bores or holes (shown at 656 and 657), and these blind bores respectively receive round plug-shaped friction generating inserts or members in the form of pads 658, 659. The partition 660 between each pair of registering blind bores 656, 657 has a preferably centrally located passage 661 for a portion of a connector 662 in the form of a rivet serving to couple the corresponding plugs 658, 659 to each other with limited freedom of movement in parallelism with the common axis of the flywheels 603, 604 and to retain such pads in their blind bores. The heads of the rivets 662 are recessed into the corresponding pads 658, 659 in a manner clearly shown in FIG. 11 so that they cannot come into contact with the respective discs 624 and 625. The shank of each rivet 662 is surrounded by an energy storing diaphragm spring 663 which is installed in prestressed condition and constitutes a means for biasing the adjacent pad 658 against the disc 624 as well as for simultaneously biasing the adjacent pad 659 against the disc 625. The radially innermost portion of each diaphragm spring 663 is slidable along the shank of the respective rivet 662. The combined bias of all diaphragm springs 663 suffices to ensure the generation of required friction between the composite friction generating inserts constituted by the pads 658, 659 on the one hand and the corresponding discs 624, 625 on the other hand.

The distance between the heads of each rivet 662 is selected in such a way that each of these rivets allows for a certain axial shifting of the corresponding pads 658, 659 away from each other (i.e., in parallelism with the common axis of the flywheels 603 and 604) against the opposition of the corresponding diaphragm spring 663. This compensates for wear upon the pads 658, 659. Moreover, such limited movability of the registering pairs of pads 658, 659 axially and away from each other facilitates the installation of the damper 614 in the torsion damping assembly because the diaphragm springs 663 can ensure that the corresponding rivets 662 and the corresponding pairs of pads 658, 659 are held in optimal axial positions relative to the flange 629. When the damper 614 is properly installed between the flywheels 603 and 604, the diaphragm springs 663 are maintained in stressed condition to thus ensure that the exposed end faces of the pads 658, 659 engage the discs 624, 625 with a required force, i.e., that the damper 614 offers the desired resistance to angular movements of the flywheels 603 and 604 relative to each other.

FIG. 11 further shows that the thickness of the pad 659 exceeds the depth of the respective blind bore or hole 657 so that the inner end face of the pad 659 bears directly against the partition 660. On the other hand, the axial length or thickness of the pad 658 is less than the depth of the respective blind bore or hole 656 so as to provide room for the prestressed diaphragm spring 663 which reacts against the partition 660 and bears against the inner end face of the respective pad 658 in order to urge the outer end face of the pad 658 against the disc 624. The pad 658 can be fully received in its blind bore or hole 656 in response to requisite axial stressing of the diaphragm spring 663.

The pad 658 can be replaced with a pad which bears against the partition 660 and extends outwardly beyond its blind hole or bore 656 the same as the pad 659, or the pads 658, 659 can be replaced with a single insert which extends in at least substantial parallelism with the common axis of the flywheels 603, 604 beyond both sides of the flange 629 and into requisite engagement with the adjacent sides of the discs 624 and 625. Each single insert is received in a bore or hole which extends all the way between the two sides of the flange 629. The illustrated structure is preferred at this time because the diaphragm spring 663 can compensate for wear upon the pads 658 and 659. The flange 629 can have some freedom of movement between the discs 624, 625 to thus ensure that the pad 659 remains in engagement with the disc 625 in spite of progressing wear upon the pad 625. Alternatively, the flange 629 can be mounted in such a way that its central portion remains in a fixed axial position but that its outer portion (which is formed with the annuli of blind holes 656, 657) can be flexed in the axial direction of the flywheels 603 and 604.

The surfaces surrounding the holes 656 and 657 (especially the surfaces surrounding the holes 656) limit the extent of movability of the respective pads in the circumferential as well as in the radial direction of the flange 629. The same holds true if each pair of pads 658, 659 is replaced with a single pad whose length (as measured in the axial direction of the flywheels 603, 604) exceeds the thickness of the flange 629 and which is movable only axially in its bore or hole, i.e., the surface surrounding each such hole or bore confines the respective single pad to movements in parallelism with the common axis of the flywheels.

The connectors 662 are not absolutely necessary, even if the flange 629 carries pairs of coaxial pads 658, 659. The primary purpose of the connectors 662 is to facilitate and simplify the installation of the flange 629 between the discs 624 and 625 of the damper 614. As mentioned above, the connectors 662 allow for limited axial movements of the respective pads 658 away from the associated (coaxial) pads 657 under the action of the corresponding diaphragm springs 663 as well as for movements of the respective pads 658 toward the associated pads 659 against the opposition of the corresponding springs 663 and to the extent permitted by the minimum thickness of the springs 663 and by the respective partitions 660.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A torsion damping assembly for taking up and compensating for fluctuations of torque which is transmitted between the internal combustion engine and the clutch in a motor vehicle, comprising a plurality of flywheels including a first flywheel arranged to receive torque for the engine and a coaxial second flywheel arranged to transmit torque to the clutch, said first and second flywheels being rotatable relative to each other; first and second damper means interposed between and arranged to yieldably oppose angular movements of said first and second flywheels relative to each other, said first and second damper means respectively comprising a first and a second pair of discs which are spaced apart from each other in the axial direction of said first and second flywheels, the discs of said first pair being distinct from said flywheels and being arranged to share the angular movements of one of said first and second flywheels and the discs of said second pair being distinct from said flywheels and being arranged to share the angular movements of the other of said fist and second flywheels, the discs of one of said pairs being disposed at least in part inwardly of the discs of the other of said pairs in the radial direction of said first and second flywheels; and means for connecting said first and second damper means in series, comprising a disc-shaped torque transmitting component disposed axially between the discs of said first and second pairs, said component being turnable with reference to each of said first and second flywheels and said first damper means further comprising first energy storing means interposed between said component and said one flywheel by way of the discs of said first pair, said second damper means further comprising second energy storing means interposed between said component and said other flywheel by way of the discs of said second pair.

2. The assembly of claim 1, wherein said torque transmitting component overlies portions of the discs of said first and second pairs, in the radial direction of said first and second flywheels.

3. The assembly of claim 1, wherein said torque-transmitting component extends radially of said first and second flywheels and outwardly beyond said one pair of discs.

4. The assembly of claim 1, wherein the discs of said second pair are arranged to rotate with said first flywheel and constitute the input element of said second damper means, said torque transmitting component constituting the output element of said second damper means and the input element of said first damper means and the discs of said first pair being arranged to rotate with said second flywheel.

5. The assembly of claim 1, further comprising means for establishing a form locking connection between said torque transmitting component and the discs of at least one of said pairs.

6. The assembly of claim 1, further comprising means for non-rotatably securing the discs of said first pair to said second flywheel and means for non-rotatably securing the discs of said second pair to said first flywheel.

7. The assembly of claim 1, wherein said second damper means further comprises means for clamping said torque transmitting component between the discs of said second pair.

8. The assembly of claim 7, wherein said clamping means comprises a friction generating device which is interposed between said torque transmitting component and one disc of said second pair.

9. The assembly of claim 1, further comprising means for securing one disc of said second pair to said other flywheel, the other disc of said second pair being movable axially of said one disc and said other flywheel.

10. The assembly of claim 9, wherein said one disc of said second pair includes means for holding the other disc of said second pair against rotation with reference to said other flywheel.

11. The assembly of claim 1, wherein one disc of said second pair has at least one aperture and the other disc of said second pair has a projection received in said aperture and arranged to hold the discs of said second pair against rotation relative to each other, and further comprising means for securing one disc of said second pair to said other flywheel.

12. The assembly of claim 11 wherein said projection is an integral part of the respective disc and extends in substantial parallelism with the common axis of said first and second flywheels.

13. The assembly of claim 11, wherein said projection forms part of that disc which is secured to said other flywheel.

14. The assembly of claim 11, wherein the disc having said projection is movable within limits axially of said flywheels.

15. The assembly of claim 11, wherein the disc having said projection includes a radially outermost portion and said projection extends axially of said flywheels from such radially outermost portion.

16. The assembly of claim 1, further comprising at least one rivet for securing one disc of said second pair to said other flywheel.

17. The assembly of claim 1, wherein one disc of said second pair is affixed to said other flywheel and the other disc of said second pair is movable axially of said one disc and includes projections extending in substantial parallelism with the common axis of said flywheels and into apertures provided therefor in said one disc, said torque transmitting component having openings for said projections.

18. The assembly of claim 17, wherein said torque transmitting component and the discs of said second pair are angularly movable relative to each other about the common axis of said flywheels within limits which are imposed by the dimensions of said openings and said projections, as considered in the circumferential direction of said flywheels.

19. The assembly of claim 18, wherein said torque transmitting component has surfaces surrounding said openings and the surface surrounding at least one of said openings cooperates with the respective projection to determine the maximum extent of angular movability of said torque transmitting component and the discs of said second pair relative to each other.

20. The assembly of claim 1, wherein said second damper means further comprises means for biasing one disc of said second pair axially of said flywheels and toward the other disc of said second pair.

21. The assembly of claim 20, further comprising means for securing the other disc of said second pair to said other flywheel, said biasing means comprising resilient means reacting against said other flywheel and bearing against the one disc of said second pair.

22. The assembly of claim 21, wherein said resilient means comprises a diaphragm spring.

23. The assembly of claim 22, wherein said other flywheel has centering means for said diaphragm spring.

24. The assembly of claim 23, wherein said centering means includes a shoulder surrounding said diaphragm spring and the latter is slotted in the region of said shoulder.

25. The assembly of claim 1, wherein said torque transmitting component has an outermost portion, as considered in the radial direction of said flywheels, said outermost portion including arms having limited freedom of angular movement relative to the discs of said second pair about the common axis of said flywheels.

26. The assembly of claim 25, wherein at least one disc of said second pair includes projections which extend in substantial parallelism with the common axis of said flywheels and alternate with the arms of said torque transmitting component to limit the extent of angular movability of said component and the discs of said second pair relative to each other.

27. The assembly of claim 1, wherein said torque transmitting component includes arms which are spaced apart from one another, as considered in the circumferential direction of said flywheels, and are disposed between the discs of said second pair, at least one of said arms having at least one friction generating lining in contact with a disc of said second pair.

28. The assembly of claim 27, wherein each of said arms has two linings one of which is in frictional contact with one disc and the other of which is in frictional contact with the other disc of said second pair.

29. The assembly of claim 1, wherein at least one of said first and second flywheels includes means for centering said torque transmitting component.

30. The assembly of claim 1, wherein the discs of said second pair have windows and said second energy storing means is installed in said windows, said torque transmitting component having a portion arranged to deform said second energy storing means in response to angular movement of said component and the discs of said second pair relative to each other.

31. The assembly of claim 30, wherein the windows in one disc of said second pair register with the windows in the other disc of said second pair, in the axial direction of said flywheels.

32. The assembly of claim 30, wherein said torque transmitting component and the discs of said second pair are angularly movable relative to each other through a first angle without deformation of said second energy storing means and through an additional angle with attendant deformation of said second energy storing means.

33. The assembly of claim 30, wherein said second energy storing means includes means for limiting the extent of angular movability of said torque transmitting component and the discs of said second pair relative to each other.

34. The assembly of claim 30, wherein said second energy storing means comprises at least one coil spring.

35. The assembly of claim 30, wherein said second energy storing means comprises a plurality of springs which are spaced apart from one another, in the circumferential direction of said flywheels, said portion of said torque transmitting component including arms alternating with said springs.

36. The assembly of claim 1, wherein at least one of said first and second flywheels has a rim extending axially toward the other flywheel, at least a portion of at least one of said damper means being located within the confines of said rim.

37. The assembly of claim 36, wherein said rim extends axially beyond said second damper means.

38. The assembly of claim 1, wherein one disc of said second pair is affixed to said other flywheel and the other disc of said second pair is movable axially of said one disc, said second damper means further comprising means for biasing said other disc axially toward said one disc and against said torque transmitting component, said other flywheel having means for locating said biasing means as considered in the axial and radial directions of said flywheels.

39. The assembly of claim 38, wherein said locating means includes a groove which is provided in said other flywheel.

40. The assembly of claim 1, wherein said other flywheel has a rim extending axially toward said one flywheel and surrounding said damper means, said second damper means further comprising means for securing one disc of said second pair to said rim so that said one disc and said other flywheel define a chamber which is surrounded by said rim, the other disc of said second pair being installed in said chamber and being movable axially of said flywheels toward and away from said one disc.

41. The assembly of claim 40, wherein said rim has an end face adjacent to said one flywheel and said one disc of said second pair is secured to said end face, said torque transmitting component including a flange which is installed in said chamber.

42. The assembly of claim 40, wherein said rim forms part of said first flywheel.

43. The assembly of claim 1, wherein one disc of said second pair is secured to said first flywheel and the other disc of said second pair is movable toward and away from said one disc in the axial direction of said flywheels, said second damper means further comprising means for biasing said other disc toward said one disc and against said torque transmitting component, said biasing means comprising a diaphragm spring reacting against said first flywheel and bearing against said other disc.

44. The assembly of claim 1, wherein one of said first and second flywheels has a rim and said torque transmitting component has arms which are inwardly adjacent to said rim so that the latter centers said component between said first and second flywheels.

45. The assembly of claim 44, wherein said second damper means further comprises friction reducing means provided on said arms and closely adjacent to said rim.

46. The assembly of claim 44, wherein said second damper means further comprises friction generating means provided on said arms and adjacent to said rim.

47. The assembly of claim 44, wherein said second damper means further comprises caps for at least some of said arms, said caps being closely adjacent to said rim to determine the position of said torque transmitting component as considered in the radial direction of said flywheels and said caps being further in contact with the discs of said second pair.

48. The assembly of claim 47, wherein at least one of said caps includes an elastic shock-absorbent portion and said other flywheel includes stop means cooperating with said shock absorbent portion to limit the extent of angular movability of said torque transmitting component and the discs of said second pair relative to each other about the common axis of said flywheels.

49. The assembly of claim 1, wherein at least one disc of said second damper means includes means for urging said torque transmitting component against the other disc of said second pair.

50. The assembly of claim 49, wherein said urging means includes undulate portions of said one disc.

51. The assembly of claim 50, wherein said one disc further includes second portions and said second damper means further comprises distancing elements spacedly securing the second portions of said one disc to said other disc.

52. The assembly of claim 51, wherein said distancing elements include portions which are affixed to said other flywheel so that said other disc and said second portions of said one disc are maintained at fixed distances from said other flywheel, as considered in the axial direction of said flywheels.

53. The assembly of claim 1, wherein one of said first and second flywheels has a peripheral rim extending axially toward the other of the first and second flywheels, said torque transmitting component having a plurality of arms inwardly adjacent to said rim and said second damper means further comprising yoke-like shoes provided on said arms and in contact with said rim to center said component between the first and second flywheels.

54. The assembly of claim 53, wherein at least one of said shoes includes at least one substantially radially extending end wall and the flywheel which is provided with said rim has stop means cooperating with said end wall to limit the extent of angular movability of said component and the discs of said second pair relative to each other.

55. The assembly of claim 54, wherein the end wall of said one shoe is movable relative to the respective arm, as considered in the circumferential direction of said flywheels.

56. The assembly of claim 54, wherein said one shoe is movable relative to its arm in the circumferential direction of said flywheels and said second energy storing means is interposed between the end wall of said one shoe and the respective arm.

57. The assembly of claim 56, wherein said second energy storing means comprises elastomeric material.

58. The assembly of claim 1, wherein said torque transmitting component and said one flywheel are movable angularly relative to each other and further comprising means for limiting the extent of angular movability of said one flywheel and said component relative to each other.

59. The assembly of claim 58, wherein said limiting means comprises at least one distancing element arranged to non-rotatably secure the discs of said first pair to said one flywheel.

60. The assembly of claim 59, wherein said torque transmitting component includes a recess receiving said distancing element with limited freedom of angular movement of said component and said one flywheel relative to each other.

61. The assembly of claim 60, wherein said torque transmitting component has a surface surrounding said recess and arranged to contact said distancing element in each of two different end positions of said component and said one flywheel relative to one another.

62. The assembly of claim 60, wherein said torque transmitting component has two teeth flanking said recess and cooperating with said distancing element to limit the extent of angular movability of said component and said one flywheel relative to each other.

63. The assembly of claim 62, wherein said torque transmitting component includes an innermost portion, as considered radially of said flywheels, and said recess is provided in such innermost portion of said component.

64. The assembly of claim 1, wherein said torque transmitting component is movable within limits relative to said one flywheel about the common axis of said flywheels.

65. The assembly of claim 1, wherein said second damper means comprises elastic clamps arranged to bias the discs of said second pair against said torque transmitting component.

66. The assembly of claim 65, wherein said clamps are U-shaped and are spaced apart from one another, as considered in the circumferential direction of said flywheels.

67. The assembly of claim 66 wherein the discs of said second pair have peripheral portions and each of said clamps includes a web adjacent to the peripheral portions of such discs as well as radially inwardly extending cheeks flanking the discs of said second pair and urging such discs toward the torque transmitting component therebetween.

68. The assembly of claim 1, wherein said other flywheel has projections and the discs of said second damper means have complementary holes for such projections so that the projections hold the respective discs against rotation relative to said one flywheel.

69. The assembly of claim 68, wherein the discs of said second pair have at least partially registering windows and said second energy storing means comprises energy storing elements in the registering windows of such discs, said torque transmitting component having arms alternating with said energy storing elements and cooperating with said energy storing elements to limit the extent of angular movability of said component and the discs of said second pair relative to each other about the common axis of said flywheels.

70. The assembly of claim 69, wherein at least one of said energy storing elements is arranged to bias one disc of said second pair relative to the other disc of said second pair so as to hold such discs against wobbling relative to said projections.

71. The assembly of claim 68, wherein said projections include bolts which are anchored in said other flywheel.

72. The assembly of claim 1, wherein said torque transmitting component has holes disposed between the discs of said second pair and said second damper means further comprises inserts provided in said holes and bearing against the discs of said second pair.

73. The assembly of claim 72, wherein said holes are parallel to the common axis of said flywheels and the length of said inserts, as considered in the axial direction of said flywheels, exceeds the thickness of said torque transmitting component.

74. The assembly of claim 72, wherein said inserts include portions which are movable in the respective holes in the axial direction of said flywheels, said torque transmitting component having surfaces bounding said holes and arranged to limit the movability of the respective inserts in the radial and circumferential directions of said component.

75. The assembly of claim 72, wherein said second damper means comprises a pair of inserts in each of said holes and said second energy storing means comprises a plurality of energy storing elements each disposed between a different pair of inserts so as to urge at least one insert of the respective pair against a disc of said second pair.

76. The assembly of claim 75, wherein each of said energy storing elements comprises a diaphragm spring.

77. The assembly of claim 75, wherein said second damper means further comprises connector means for coupling the inserts of each pair to one another with freedom of movement in the axial direction of said flywheels.

78. The assembly of claim 72, wherein each of said holes includes two blind holes one of which faces one disc of said second pair and the other of which faces the other disc of said second pair, each of said inserts including a first friction generating member axially movably mounted in one blind hole and bearing against the respective disc of said second pair and a second friction generating member installed in the other blind hole and bearing against the other disc of said second pair.

79. The assembly of claim 78, wherein said torque transmitting component comprises a partition disposed between each pair of blind holes and having a passage communicating with the respective blind holes, said second damper means further comprising connector means for coupling said first inserts to the respective second inserts with some freedom of axial movement of such inserts relative to one another, said connector means extending through the passages of the respective partitions.

80. The assembly of claim 79, wherein said second energy storing means includes an energy storing element provided in at least one blind hole of each pair of blind holes and arranged to bias the respective insert axially of said flywheels against the adjacent disc of said second pair.

81. The assembly of claim 80, wherein said energy storing elements include diaphragm springs and each axially biased insert is movable nearer to the associated insert against the opposition of the corresponding diaphragm spring.

82. The assembly of claim 1, wherein said first damper means is disposed inwardly of said second damper means, as considered in the radial direction of said flywheels.

* * * * *